United States Patent Office 3,551,399
Patented Dec. 29, 1970

3,551,399
MANUFACTURING METHOD OF VINYL CHLORIDE POLYMERS FOR PASTE RESIN
Shuzo Yonezu, Yasuhiro Nojima, and Kimio Ban, Osaka, Japan, assignors to Kanegafuchi Chemical Industry Company, Limited, Osaka, Japan, a corporation of Japan
No Drawing. Filed Feb. 1, 1967, Ser. No. 613,129
Claims priority, application Japan, Jan. 31, 1966, 41/5,782
Int. Cl. C08f 1/13, 1/78, 3/30
U.S. Cl. 260—92.8                    2 Claims

ABSTRACT OF THE DISCLOSURE

A manufacturing method of vinyl chloride polymers for paste resin which includes the steps of homogenizing an aqueous dispersion comprising vinyl chloride monomer, emulsifier, saturated aliphatic compound having more than eight carbon atoms and azobis ($\alpha$, $\gamma$-dimethyl) valeronitrile or its mixture with isopropylperoxydicarbonate as a catalyst and then suspension polymerizing it under heating.

---

This invention relates to a manufacturing method of vinyl chloride polymers for paste resin, and its object is to manufacture this paste resin of high quality advantageously on an industrial scale.

While a lot of manufacturing methods of vinyl chloride polymers for paste resin have been known and practised, resins obtained by whichever method are defective in many counts. For example, while in manufacturing, initial viscosities of the sols (plastisols, organosols) are high, and the sol viscosities abruptly rise with the passing of time, rendering their forming difficult. In transparent formed products, their transparency is not good. Other disadvantages may be cited.

The present invention relates to a manufacturing method of polyvinyl chloride polymers for paste resin which has no such disadvantages as mentioned above, wherein a system in which vinyl chloride alone or its mixture with monoolefinic monomers which have the capability of copolymerization is dispersed in water containing the emulsifier, saturated fatty compounds of the carbon number higher than 8, and as the polymerization initiator, azo-bis ($\alpha,\gamma$-dimethyl)-valeronitrile (hereinafter-after referred to as ABVN) or its mixture with isopropylperoxydicarbonate (hereinafter abbreviated as IPP), is subjected to homogenization, and then to suspension polymerization with heat, thereby yielding resins 0.1–1.0$\mu$ in particle size (weight) on the average. Details follow:

The monomer used according to this invention is vinyl chloride. Besides, mixed monomers of this monomer with monoolefinic monomers which have the capability of copolymerization, e.g., vinyl acetate, vinylidene chloride, acrylonitrile, acrylic ester, methacrylic ester, maleic acid, etc., may be used. In this latter instance, the monomers for the copolymerization are used at below 30 (weight) percent.

In the next place, the emulsifier includes such anionic compounds as fatty acid salts, long chain alcohol sulfate, liquid fatty oil sulfates, alcohol phosphates, sulfonates of dibasic fatty acid esters, fatty acid amide sulfonates, alkyl allyl sulfonates, naphthalene sulfonates obtained through formaldehyde condensation, etc. These compounds may be used singly or in combination of more than two of them. Nonionic compounds (e.g., polyoxyethylene alkyl ether, polyoxyethylene alkyl ester, etc.) may be jointly used. This emulsifier is used preferably at 0.2–4% by weight of the monomer.

Saturated fatty compounds with the carbon number higher than 8 are used as the dispersing agent of the system, those compounds with the carbon number 16, 18, and higher, are desirable. Those with less than 8 carbon number are ineffectual as the dispersing agent are disfavored and unable to prevent the aggregation of the dispersed drops during the polymerization. Illustrated as dispersing agents, among fatty acids, are palmitic acid, stearic acid, etc., and among long chain alcohols, are cetyl alcohol, stearyl alcohol, oxypalmitic acid, etc. These compounds may be used singly or in combination of more than two of them. They are used preferably at 0.2–4% by weight of the monomer.

As the polymerization initiator, ABVN is employed. At present, the initiators used in industry are limited to benzoyl peroxide, lauroyl peroxide, azo-bis-butyronitrile, and other several compounds. These compounds cannot be said quite satisfactory in the decomposition rate and the polymerization initiator efficiency. Of late, alkyl peroxy dicarbonate, and so forth, have been developed as the so-called quick acting variety. When these compounds are used in the polymerization, the velocity is too high, rendering the control of heat of reaction difficult, and during the polymerization, formation of lumpy matters is rather heavy with some parts adhering to the wall of the container. Such drawbacks were inevitable. It was found out, however, that when vinyl chloride is polymerized using ABVN in the presence of the afore-mentioned emulsifier, and dispersing agent, desirable polymers are obtainable at a velocity acceptable to industry without such unfavorable occurrences. The particle of the polymers obtained is spherical in shape and compact. Their particle size distribution is very good to make a paste resin. They excel in physical properties, particularly in transparency and heat resistivity. While ABVN is singly used as a polymerization initiator which is quite adaptable to the object of this invention, for manufacture of highly polymerized resins (with the polymerization degree higher than 2000) in an attempt to have special products excelling in mechanical properties, use of lesser amounts of the quick acting IPP in conjunction with this compound will give good results. Although depending on the polymerization temperature, the amount of ABVN used should be arbitrarily chosen within the range of 0.02–0.2% (by weight of the monomer). For example, at 50–60° C., the preferable amount falls to 0.03–0.06%, and at 40° C., about 0.1%. ABVN may be added in total amount from the beginning, or little by little or continuously during the polymerization.

Furthermore, the polymerization may be carried out with the plasticizer, heat stabilizer and the like put in the polymerization system.

The method of polymerization of this invention is by way of suspension polymerization. Thus, the dispersion system is prepared by adding the monomer into water containing the emulsifier, the dispersing agent and the polymerization initiator (ABVN or its joint use with IPP). Then, this system is subjected to homogenizing treatment. This treatment is done by the ordinary method. For example, the droplets are further finely dispersed by the use of the colloid mill, the homo-mixer, the two stage high pressure pump homogenizer and other homogenizers. The homogenizing treatment may be given continuously during the polymerization. The polymerization temperature is the same as in the ordinary method. Usually, it is 40–60° C. Stirring is desirably made to a moderate strength where aggregation of the dispersed droplets is preventable. If the homogenizing treatment is made continuously during the polymerization, the stirring may be omitted.

In this way, as the polymerization runs to completion, the intended resin is obtained by the ordinary method.

The initial viscosity of the plastisol from this resin thus obtained is the lowest of all usual products, and its time change is small (it is preserved well) as shown in Table 1.

TABLE 1

| Resin | Days | | | | | |
|---|---|---|---|---|---|---|
| | 1 | 2 | 3 | 5 | 7 | 13 |
| The product of this invention: | | | | | | |
| Example 1, cps | 2,300 | 3,000 | 3,300 | 4,000 | 4,200 | 4,700 |
| Example 2, cps | 2,000 | 2,500 | 2,600 | 3,300 | 3,500 | 4,200 |
| Control: | | | | | | |
| a, cps | 4,200 | 5,600 | 7,000 | 8,200 | 9,400 | 11,000 |
| b, cps | 10,300 | 11,200 | 12,800 | 15,400 | 18,900 | 24,000 |
| c, cps | 5,400 | 7,200 | 9,800 | 12,400 | 13,400 | 18,900 |
| The product on the market, cps | 4,400 | 7,900 | 8,400 | 11,400 | 14,000 | 21,400 |

NOTE—
Recipe: Resin 100 parts, dioctyl phthalate 60 parts, stabilizer (liquid cadmium-barium-stabilizer) 3 parts.
Method of measurement: The viscosity was measured at temperature of 30° C. and the rotational frequency of 40 r.p.m./min., using the Rigo-MacMichael viscosimeter.
The temperature when standing the sol: 30° C.

From Table 1, it is understood that the resin particles obtained by the method of this invention, are spherical in shape and compact, and have a particle distribution suitable to make a paste.

The cast film produced from this resin obtained in this way excels in transparency and heat stability as shown in Table 2.

TABLE 2

| Resin | Items | |
|---|---|---|
| | Light transmission ratio, percent | Heat stability 170° C.x mins. |
| The product of this invention: | | |
| Example 2 | 79 | 105 |
| Example 4 | 88 | 110 |
| Control: | | |
| a | 52 | 45 |
| b | 53 | 60 |
| c | 61 | 60 |

NOTE—
Recipe: Resin 100 Parts, DOP 60 Parts, Liquid Cd-Ba stabilizer 3 Parts. The mixture prepared on the recipe above, after standing the lapse of a day, is deaerated, is flowed on a glass plate, and is then melted well for 10 minutes at 180° C.; producing a film of 0.80±0.03 mm. thickness.
Heat stability: The time is taken (in minute) before the afore-mentioned film becomes blackened while being heated at 170° C. in the Gear's oven.
Light transmission ratio: Measurements are taken three times using the Micron Photosizer, MSKK type light transmission particle measuring instrument, and the average is taken.

In the following, examples are cited for better understanding of this invention. (The part denotes part by weight.)

EXAMPLE 1

Two hundred parts water, 0.03 part ABVN, 0.6 part dodecylbenzene sulfonate and 0.6 part cetyl alcohol were put in a reaction vessel of stainless steel autoclave of 50 l., and after the air inside was replaced with nitrogen gas, 100 parts vinyl chloride was charged in. The mixture was then passed through the Wesco pump and the colloid mill, respectively in 2 hours, to be dispersed and homogenized. Polymerization was carried out while stirring at 50 r.p.m. with the system raised to and held at 58° C. In 11 hours, the internal pressure dropped to 4 kg./cm.², and the polymerization came to an end. The resin obtained in this way was pure white. Its weight average diameter was 0.7μ (micron), and its sol viscosity 2300 cps. Time change in viscosity is small as compared with that of the usual product as shown in Table 1.

EXAMPLE 2

| | Parts |
|---|---|
| Vinyl chloride | 100 |
| Water | 200 |
| ABVN | 0.06 |
| Dodecylbenzenesulfonate | 1 |
| Stearic acid | 1 |

The homogeneous dispersion system treated as in Example 1 was subjected to polymerization at 45° C., with stirring at 50 r.p.m., and for 10 hours, yielding the resin. As in the case of Example 1, no adhering matter on the container wall was observed during the polymerization. Transparency and heat stability of the cast film made from this resin were good, being respectively, 79%, 170° C.×105 min. as shown in Table 2.

EXAMPLE 3

Polymerization was carried out at 30° C. as in Example 2 but with 0.04 part ABVN and 0.02 part IPP used as the mixed catalyser, and then, a resin with the polymerization degree 3000 and excelling in mechanical characteristics was obtained. During the polymerization, no deposited matter was formed, and the properties of the resin obtained in the way were good to make a paste.

EXAMPLE 4

| | Parts |
|---|---|
| Vinyl chloride | 100 |
| Vinyl acetate | 10 |
| Water | 200 |
| ABVN | 0.06 |
| Dodecylbenzenesulfonate | 1 |
| Stearic Acid | 1 |

The system prepared on the recipe mentioned above and treated in the same way as in Example 1 was subjected to polymerization at 52° C. for 9 hours. The melting temperature of this resin was low at 130° C. (for the product on the market it is 180° C.), and the transparency of its cast film was very good at 88%.

| | Controls | |
|---|---|---|
| | (a) | (b) |
| | Parts | |
| Vinyl chloride | 100 | 100 |
| Water | 200 | 200 |
| Dioctylperoxydicarbonate | 0.06 | 0.06 |
| Codecylbenzenesulfonate | 1 | 1 |
| n-Octyl alcohol | 1 | |
| Lauryl alcohol | | 1 |

Condition of the polymerization: Temperature 45° C., stirring at 50 r.p.m.

Running account of the polymerization: The internal pressure dropped to 4 kg./cm² in 15 hours.—(a) more than half of the polymers aglomerated; (b) rough particles larger than 60 mesh were 30%, and the product was therefore unfit to make the paste resin.

Light transmission ratio: (a) 52%; (b) 53%.

Heat stability: (a) 170° C. × 45 min.; (b) 170° C. × 60 min.

Control (c):

| | Parts |
|---|---|
| Vinyl chloride | 100 |
| Water | 200 |
| Lauroyl peroxide | 0.4 |
| Dodecylbenzenesulfonate | 0.6 |
| Cetyl alcohol | 0.6 |

The mixture prepared as above was polymerized as in Example 1. Adhering matters on the container wall were heavy, and rough particles many. Viscosity of its plastisol was high at 5,400, and its time change great. Its heat-stability was not good.

| | Examples | |
|---|---|---|
| | (5) | (6) |
| | Parts | |
| Vinyl chloride | 100 | 100 |
| Water | 200 | 200 |
| ABVN | 0.03 | 0.03 |
| Sodium lauryl sulfate | 1 | 1 |
| Cetyl alcohol | 1 | 0.5 |
| Di (2-ethylhexyl) phthalate | | 1 |

The system prepared on the recipe mentioned above was homogenized and dispersed in the two stage high pressure pump homogenizer. Then, the polymerization was started by raising the temperature. The polymerization was continued for 9 hours at 58° C. while homogenizing the system by operating the homogenizer continuously even after the polymerization started.

The running account of the polymerization and the properties of the resin obtained were both good. The average diameter (weight) of the particles was about 0.2µ.

What we claim is:

1. Method of manufacturing vinyl chloride polymers for paste resin, comprising the steps of
    (1) dispersing in water,
        (A) ingredient selected from the group consisting of
            (a) vinyl chloride, and
            (b) mixtures of vinyl chloride and monoolefinic monomers copolymerizable therewith,
        (B) emulsifier in an amount from 0.2 to 4 weight percent of said ingredient,
        (C) stearic acid in an amount from 0.2 to 4 percent of said ingredient, and
        (D) Polymerization initiator selected from the group consisting of
            (a) azo-bis - (alpha,gamma-dimethyl) - valeronitrile, and
            (b) mixture of azo - bis - (alpha,gamma-dimethyl) - valeronitrile and isopropyl peroxydicarbonate.
        said initiator being in an amount from 0.02 to 0.2 weight percent of said ingredient;
    (2) homogenizing the resulting dispersion; and
    (3) suspension polymerizing the homogenized dispersion at a temperature of from about 40° C. to 60° C.

2. Method of claim 1, wherein said homogenizing and polymerizing steps are carried out concurrently.

References Cited

UNITED STATES PATENTS

| | | | |
|---|---|---|---|
| 2,890,212 | 6/1959 | Lintala | 260—92.8W |
| 2,471,959 | 5/1949 | Hunt | 260—92.8 |
| 3,373,150 | 3/1958 | Pears et al. | 260—92.8W |
| 3,324,097 | 6/1967 | Pears | 260—928 |

JOSEPH L. SCHOFER, Primary Examiner

J. A. DONAHUE, JR., Assistant Examiner

U.S. Cl. X.R.

260—85.5, 86.3, 87.1, 87.5, 87.7